United States Patent
Horng et al.

(10) Patent No.: US 6,396,231 B1
(45) Date of Patent: May 28, 2002

(54) FAN MOTOR HAVING TWO-STAGE SPEED CONTROL

(75) Inventors: Alex Horng; Ming-Sheng Wang; Nan Long Tsai, all of Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/781,973

(22) Filed: Feb. 14, 2001

(51) Int. Cl.⁷ .................................................. G05B 5/00
(52) U.S. Cl. .................. 318/471; 318/471; 318/461; 318/473; 318/811; 318/472
(58) Field of Search .................... 385/934; 318/471, 318/461, 811, 798, 473, 472, 254, 138, 635

(56) References Cited

U.S. PATENT DOCUMENTS

| | | | |
|---|---|---|---|
| 4,357,988 A | * 11/1982 | Hudson et al. | 318/461 |
| 5,197,858 A | 3/1993 | Cheng | |
| 5,942,866 A | 8/1999 | Hsieh | |
| 6,040,668 A | * 3/2000 | Huynh et al. | 318/471 |
| 6,252,209 B1 | * 6/2001 | Liepold | 318/471 |

* cited by examiner

Primary Examiner—Karen Masih
(74) Attorney, Agent, or Firm—Bacon & Thomas, PLLC

(57) ABSTRACT

A fan motor having a two-step speed control includes a buffer circuit, a control voltage terminal, and a fan. The buffer circuit is mounted between a voltage source and a source terminal of the fan. The buffer circuit includes a resistor and a transistor. The control voltage terminal is connected to a transistor of the buffer circuit to control conduction or non-conduction of the transistor, thereby changing the voltage of the source terminal of the fan. The varying voltage waveforms are smooth linear waveforms such that rotating speed of the fan is increased or decreased gradually during switching between a low-speed operation mode and a high-speed operation speed.

5 Claims, 5 Drawing Sheets ns speed of the fan changes dramatically. As a result, the fan wobbles and the longevity of the fan is shortened.

FAN MOTOR HAVING TWO-STAGE SPEED CONTROL

BACKGROUND OF THE INVENTION

1. Field of the Invention

The present invention relates to a fan motor having two-step speed control, and more particularly to a fan motor that may output smooth voltage waveforms by a buffer circuit while altering the voltage level, such that the speed of the fan is increased or reduced gradually when the fan is switched between a low speed operation mode and a high speed operation mode, thereby lengthening longevity of the fan motor.

2. Description of the Related Art

It is common to employ heat-dissipating fans in computers and their peripherals to avoid break down of the system or burnt of the electronic elements resulting from temperature rise due to poor heat dissipation. During operation of a fan motor, the fan motor is operated in a low speed mode when the temperature in the system is not high. In this case, unnecessary load and noise are generated if the fan motor is operated at high speed. When the system is under full load and thus has a relatively high temperature that requires the fan operates in a high speed mode, otherwise the system may break down and/or the electronic elements may be burnt. In order to solve the above problems, speed-controllable heat-dissipating fans have been developed to adjust the speed of the fan in response to different system temperatures.

A conventional fan motor is shown in FIG. 1 and FIG. 2 (including FIGS. 2A–2C) of the drawings that correspond to FIG. 2 and FIG. 5 (including FIGS. 5A–5C) of U.S. Pat. No. 5,197,858 to Cheng issued on Mar. 30, 1993. FIG. 1 is a circuit diagram of a controller for the fan. FIG. 2 illustrates the output waveforms for the drive IC of the circuit. As illustrated in FIG. 1, when the power is on, via an reverse voltage protection diode D1, impellers start to rotate by mutual induction between winding coils and magnet. At this time, a Hall element IC1 senses the variation of magnetic field between winding and magnet to cause the DC brushless motor to commute as follows: A predetermined current and DC level are supplied by resistors R3, R2. Positive (V+) and negative (V−) voltages are both output from the Hall element IC1 to a driving integrated circuit IC2. The two voltage waveforms can be processed and shaped by means of the driving integrated circuit IC2 by comparing them with an internal voltage to obtain the waveform shown in FIG. 2A. This waveform controls semiconductor switches A1 and A2 to obtain the waveform shown as FIGS. 2B and 2C. Motor windings L1, L2, L3, and L4 are controlled by the wave output from the semiconductor switches A1, A2 to commutate in accordance with the magnetic couple of impeller ring-shaped magnet. The timing capacitor provides voltage to the driving integrated circuit IC2 for re-starting of the motor from a completely stop state of the fan. As a result, a driving system composed of IC1 and IC2 can drive the fan and output a cycle-timing pulse signal.

IC3 comprises three internal operational amplifiers IC31, IC32. IC33. Operational amplifiers IC31, with resistors R4, R5, R6, R7, R8, R9, R10 and a thermal sensor Rth in combination, forms a control circuit for the slope of the curve of the speed versus the temperature of the thermal control variable speed fan. Because the resistance value of the thermal sensor Rth changes with temperature, the voltage Va which is dependent upon the resistance of sensor Rth and resistor R4 will also be changed as the temperature changes. Voltage Va and the reference voltage Vref, which is controlled by the voltage divider formed by resistors R9 and R10, are input into operational amplifier IC31, to obtain a variable voltage Vb, which causes the collector current of transistor TR1 to change accordingly, changing the speed of the fan. Therefore, the object of the variable speed by thermal control is achieved.

Nevertheless, the waveforms output from the drive integrated circuit IC2 to the windings L1, L2, L3, and L4 are square waveforms, as shown in FIGS. 2B and 2C. In addition, although the change in the output voltage Vb by the operational amplifier IC31 in response to change in the system environmental temperature make a change in the conductive current in the transistor TR2, output waveforms of the transistor TR2 are still square waveforms. Thus, rotating speed of the system fan is increased or reduced dramatically due to square waveforms inputted to the windings L1, L2, L3, and L4. As a result, the fan wobbles and thus has a shortened longevity.

Another conventional fan motor is shown in FIGS. 3 and 4 of the drawings that correspond to FIG. 2 and FIG. 3 of U.S. Pat. No. 5,942,866 to Hsieh issued on Aug. 24, 1999. FIG. 3 is a schematic block diagram of a control circuit. FIG. 4 shows the waveform signal outputted from a switching device of the control circuit. As illustrated in FIG. 3, a control circuit 10 for a DC brushless fan comprises a rectifying circuit 20, a comparator 21, and a switching device 22. The rectifying circuit 20 receives a continuous, square wave signal from the fan 23, which is indicative of the rotating speed of the fan 23, and then sends a rectified and filtered DC voltage signal V1 to inverted input terminal of the comparator 20. The non-inverted input terminal of the comparator 21 is connected to a reference voltage signal Vref, which is used for setting the rotating speed of the fan 23, and the output terminal of the comparator 21 is connected to the switching device 22. The switching device 22 may be a transistor or an equivalent electronic switch that is serially connected between a source voltage Vcc and the source terminal of the fan 23. The operation of the switching device 22 depends on the compared result of the rectified DC voltage signal V1 outputted from the rectifying circuit 21 and the reference voltage signal Vref.

When the DC voltage signal V1 outputted from the rectifying circuit 21 is lower than the reference voltage signal Vref, i.e., the rotating speed of the fan 23 is lower than its setting value, the comparator 21 outputs a Logic high value to the switching device 22. Then, the switching device 22 is closed, and the fan 23 is powered on. Thus, rotating speed of the fan 23 will be increased.

In contrast, when the DC voltage signal outputted from the rectifying circuit 20 is higher than the reference voltage signal Vref, i.e., the rotating speed of the fan 23 is higher than its setting value, the comparator 21 outputs a Logic low value to the switching device 22. Then, the switching device 22 is opened, and the fan 23 is powered off. Thus, rotating speed of the fan 23 will be decreased.

In operation, the switching device 22 is repeatedly closed and opened as the rotating speed of the fan varies, thus the fan is intermittently powered on, whereby the rotating speed of the fan 23 can be controlled and kept at a constant value. As illustrated in FIG. 4, the output signal of the switching device 22 is an intermittently opened and closed square wave, where the period (TIME ON) during which the switching device 22 is closed and the period (TIME OFF) during which the switching device 22 is opened are modulated so as to control the rotating speed of the fan 23.

Nevertheless, the output waveform is an intermittently opened and closed square waveform, and the rotating speed of the fan 23 is increased or decreased dramatically in response to opening or closing of the sequare waveform or the switching device 22. As a result, the fan wobbles and thus has a shortened longevity.

SUMMARY OF THE INVENTION

In view of the above drawbacks, the present invention provides a buffer circuit that is connected to the voltage source. The buffer circuit outputs different voltages in response to a change in the control voltage for driving the fan. During a change between a high voltage value and a low voltage value, the voltage waveform is a smooth linear waveform. Rotating speed of the fan is increased or decreased gradually to avoid dramatic change in the rotating speed of the fan to thereby lengthening longevity of the fan.

It is the primary object of the present invention to provide a fan motor having two-step speed control, wherein a buffer circuit is provided between the voltage source and a source terminal of the fan. The buffer circuit outputs a smooth linear voltage-varying waveform. Rotating speed of the fan is increased or decreased gradually to avoid dramatic change in the rotating speed of the fan to thereby lengthening longevity of the fan.

It is another object of the present invention to provide a fan motor having two-step speed control with less and simple component and by means of a resistor resistance to set the low speed of the fan. The fan motor mainly comprises a buffer circuit, a control voltage terminal, and a fan. The buffer circuit is mounted between the voltage source and a source terminal of the fan. The buffer circuit comprises a resistor and a transistor, wherein the control voltage terminal is connected to the base of the transistor of the buffer circuit. When the voltage of the voltage source equals to the control voltage, the transistor of the buffer circuit is open. At this time, the resistor of the buffer circuit will divide the source voltage to lower the fan-driving voltage, and the fan operates at the low-speed operation mode. When the control voltage is zero, the transistor of the buffer circuit is closed such that the fan-driving voltage equals to the voltage of the voltage source, and the fan operates at the high-speed operation mode.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

A fan motor having a two-step speed control in accordance with the present invention includes a buffer circuit, a control voltage terminal, and a fan. The buffer circuit is mounted between a voltage source and a source terminal of the fan. The buffer circuit includes a resistor and a transistor. Two ends of the resistor are connected to the emitter and the collector of the transistor, respectively. The base of the transistor is connected to the control voltage terminal via a resistor. In addition, the base of the transistor is connected to the voltage source via another resistor. When the voltage of the voltage source equals to the control voltage, the transistor of the buffer circuit is open. The resistor divides the voltage and lowers the fan-driving voltage at the source terminal of the fan, and the fan operates at the low-speed operation mode. When the control voltage is zero, the transistor of the buffer circuit is closed such that the fan-driving voltage equals to the voltage source, and the fan operates at the high-speed operation mode.

The fan motor having two-speed control in accordance with the present invention may detect the environmental temperature by a temperature-sensing circuit to obtain a temperature-dependent voltage (hereinafter referred to as "temperature voltage"). The temperature voltage and the voltage of the voltage source are compared in a comparator to decide the operation mode of the fan.

Figure 5:
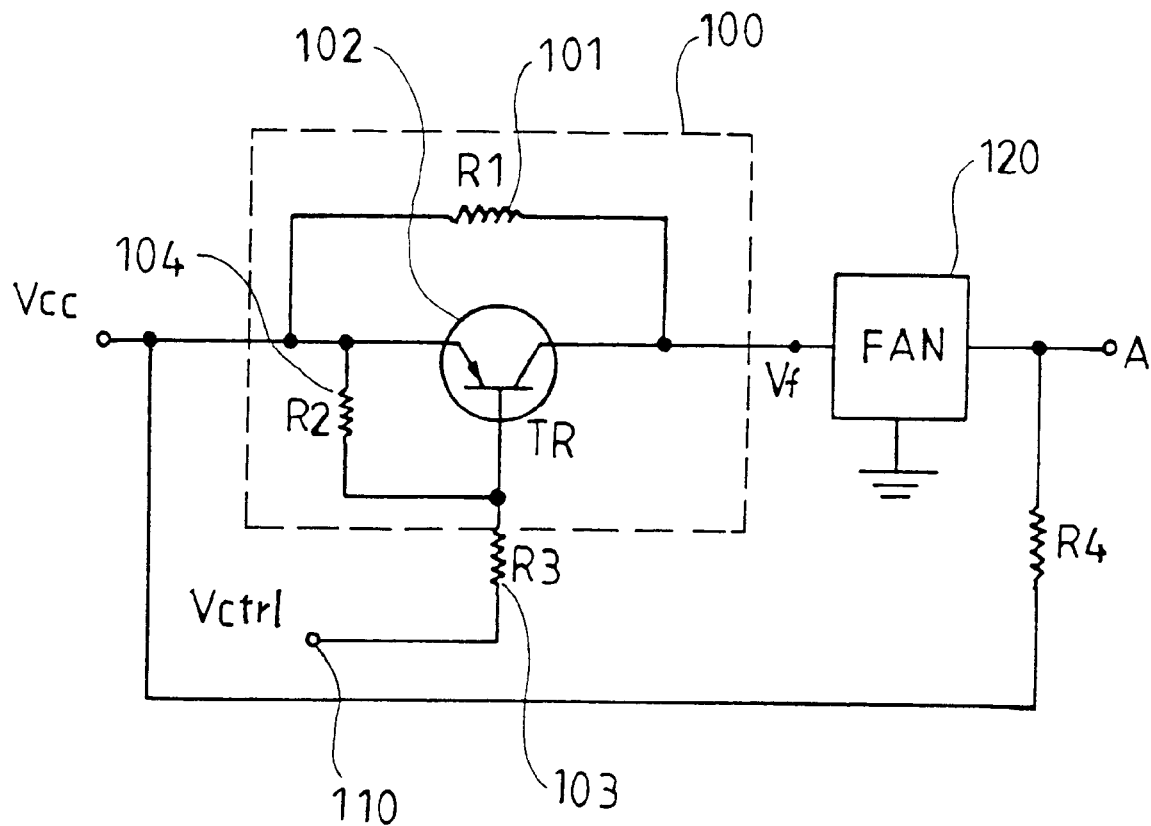
FIG. 5 is a diagram of a circuit of a first preferred embodiment of a fan motor having two-stage speed control in accordance with the present invention.
Figure 6A:
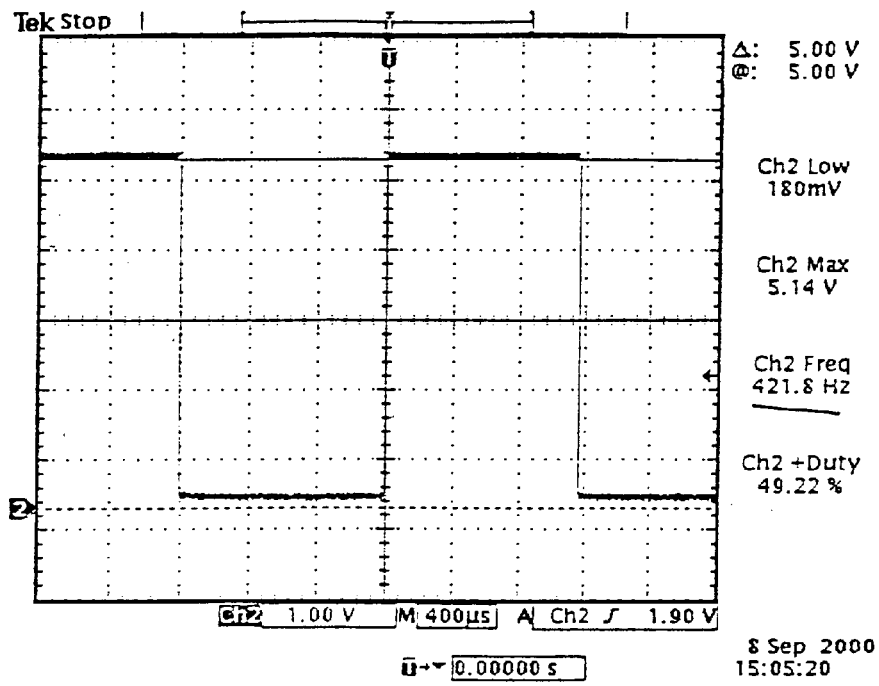
FIG. 6A shows the signal representing the speed of the fan at the low-speed operation mode.
Figure 6B:
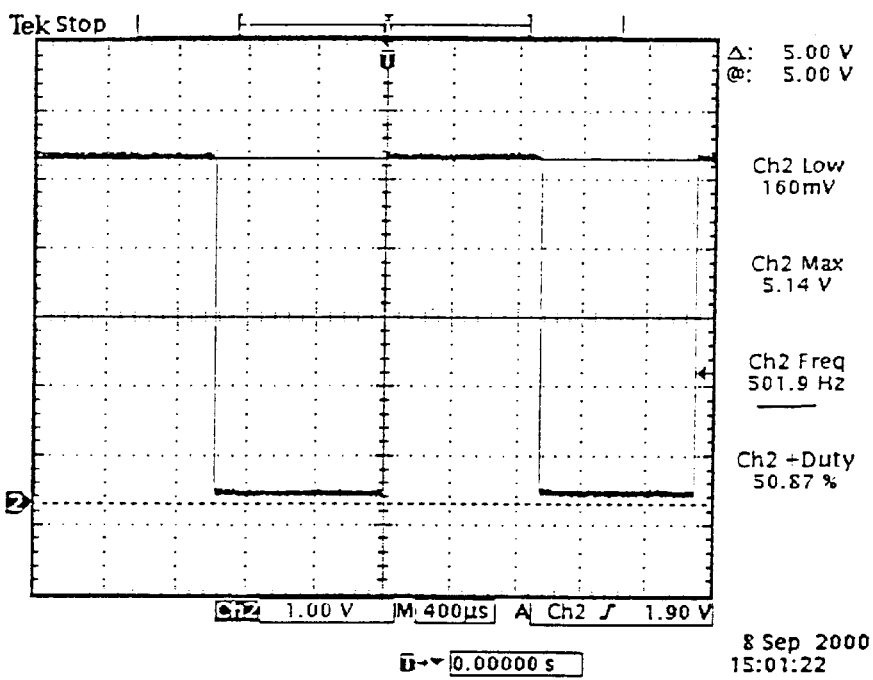
FIG. 6B shows the signal representing the speed of the fan at the high-speed operation mode.

FIG. 5 is a diagram of a circuit of a first preferred embodiment of a fan motor having two-step speed control in accordance with the present invention. FIG. 6A shows the signal representing the speed of the fan at the low-speed operation mode. FIG. 6B shows the signal representing the speed of the fan at the high-speed operation mode.

Referring to FIG. 5, the first preferred embodiment of the fan motor having a two-step speed control in accordance with the present invention includes a buffer circuit 100, a control voltage terminal 110, and a fan 120. The buffer circuit 100 is mounted between a voltage source Vcc and a source terminal Vf of the fan 120. The buffer circuit 100 includes a resistor R1 (101) and a transistor TR (102). Two leads of the resistor 101 are connected to the emitter and the collector of the transistor 102, respectively. The base of the transistor 102 is connected to the control voltage terminal 110 via a resistor 103. In addition, the base of the transistor 102 is connected to the voltage source Vcc via another resistor 104.

When the voltage of the voltage source Vcc equals to the control voltage Vctrl, the transistor 102 of the buffer circuit 100 is open such that electric current cannot pass. The resistor 101 divides the voltage and lowers the fan-driving voltage Vf and the fan 120 operates at the low-speed operation mode by means of driving the fan 120 by a low voltage. Thus, the rotating speed of the fan 120 at the low-speed operation mode is variable by changing the resistance of the resistor 101. When the control voltage Vctrl is zero, the transistor 102 of the buffer circuit 100 is closed such that the fan-driving voltage Vf equals to voltage of the voltage source Vcc, and the fan 100 driven by the full voltage of the voltage source Vcc operates at the high-speed operation mode.

During switching from the open status to the closed status of the transistor 102, the fan-driving voltage Vf is increased gradually from the divided voltage of the resistor 101 to the voltage of the voltage source Vcc. Alternatively, during switching from the closed status to the open status of the transistor 102, the fan-driving voltage Vf is decreased gradually from the voltage of the voltage source Vcc to the divided voltage of the resistor 101. FIG. 6A shows the signal representing the speed of the fan at the low-speed operation mode, wherein the voltage of the voltage source Vcc equals to the control voltage Vctrl. FIG. 6B shows the signal representing the speed of the fan at the high-speed operation mode, wherein the fan-driving voltage Vf equals to the voltage of the voltage source Vcc.

Figure 1:
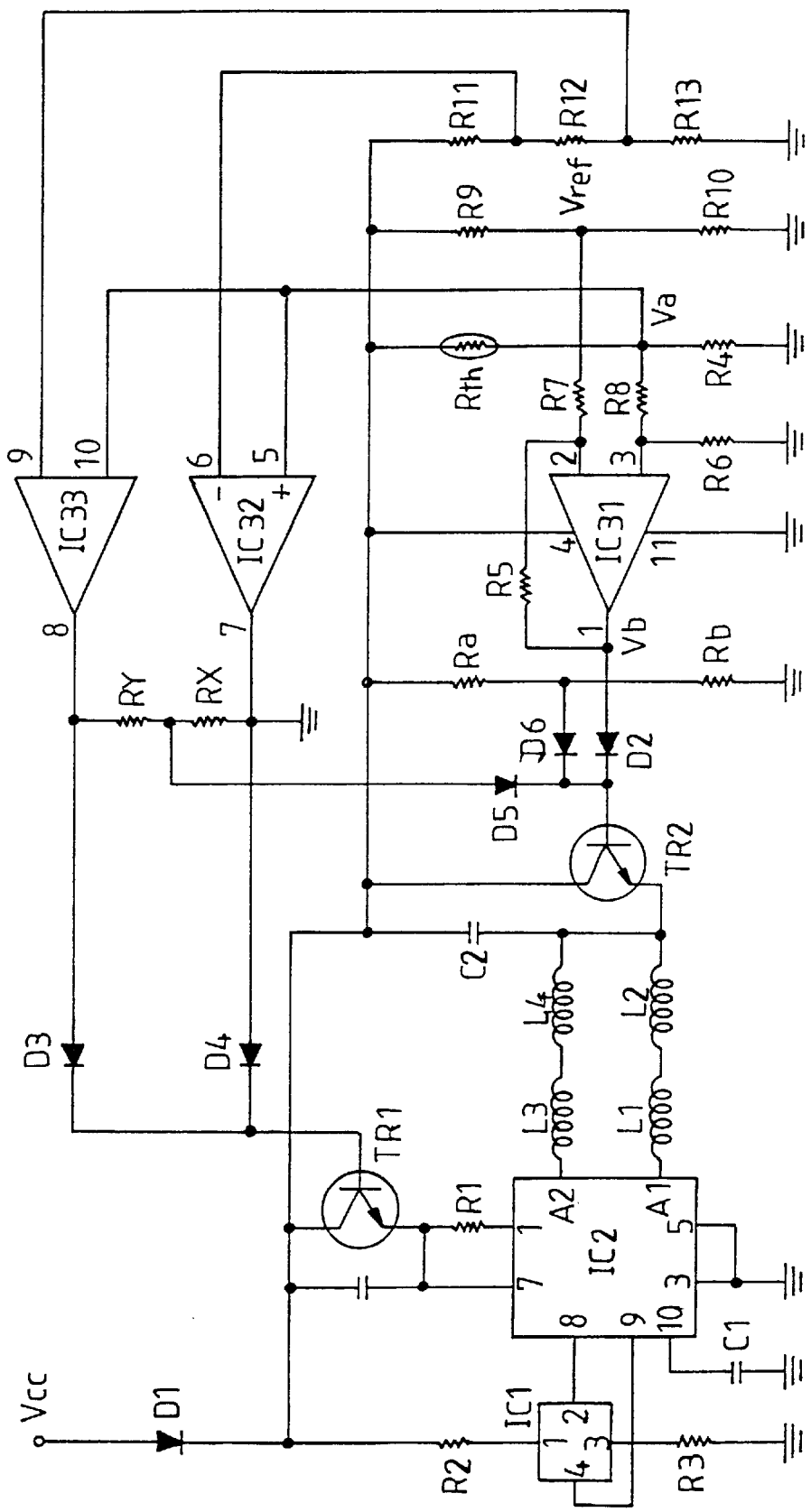
FIG. 1 is a circuit diagram of a conventional controller for the fan.
Figure 2:
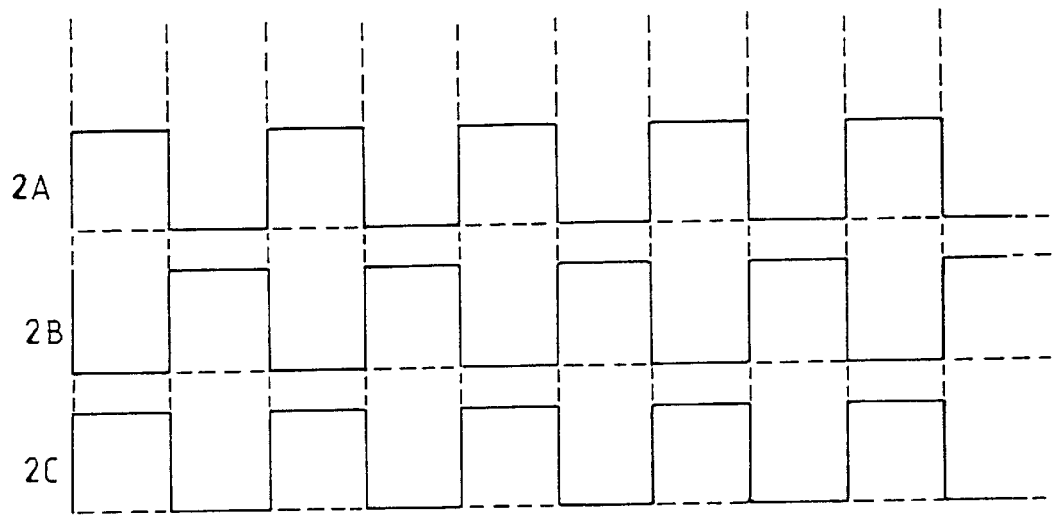
FIG. 2 is a diagram illustrating the output waveforms for the drive IC of the circuit in FIG. 1.
Figure 3:
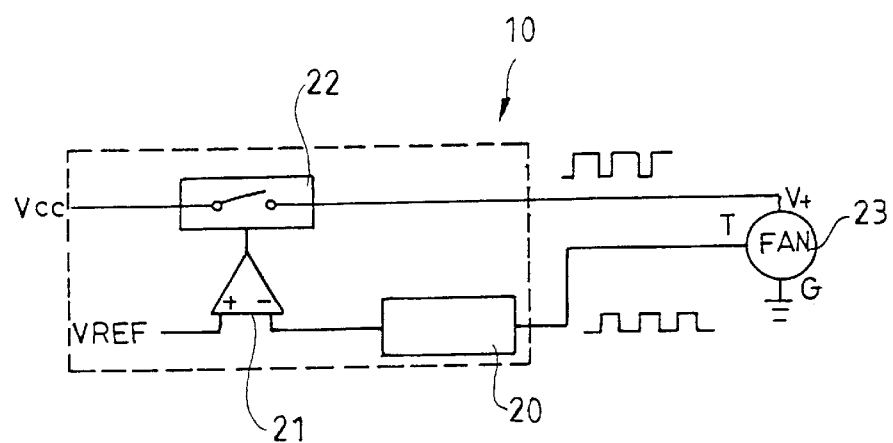
FIG. 3 is a schematic block diagram of another conventional control circuit.
Figure 4:
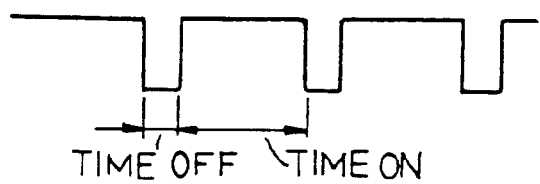
FIG. 4 shows the waveform signal outputted from a switching device of the control circuit in FIG. 3.

Referring to FIGS. 1, 3, and 5, in the thermal control variable speed DC brushless fan disclosed in U.S. Pat. No. 5,197,858, although the conducting current of the transistor TR2 is varied by the operational amplifier IC31 in response to a change in the environmental temperature, the transistor TR2 can merely output square waveforms consisting of zero voltage and source voltage. The square waveforms activate the windings L1, L2, L3, and L4 such that the rotating speed of the fan is increased or reduced in response to square waveforms. As a result, the fan wobbles and thus has a shortened longevity. In addition, in the pulse width modulation control circuit for a DC brushless fan disclosed in U.S. Pat. No. 5,942,866, the output waveform is an intermittently opened and closed square waveform, the rotating speed of the fan 23 is increased or decreased dramatically in response to opening or closing of the square waveform or the switching device 22.

By contrast, by means of the buffer circuit 100 consisting of the resistor 101 and the transistor 102, the fan 120 is prevented from being at a zero voltage status. Thus, no matter the control voltage Vctrl is zero or equals to the voltage of the voltage source Vcc, the fan-driving voltage Vf has a smooth linear waveform by means of the buffer circuit 100. Thus, rotating speed of the fan 120 is increased or decreased gradually during switching between the low-speed operation mode and the high-speed operation speed. Longevity of the fan 120 is thus lengthened.

Figure 7:
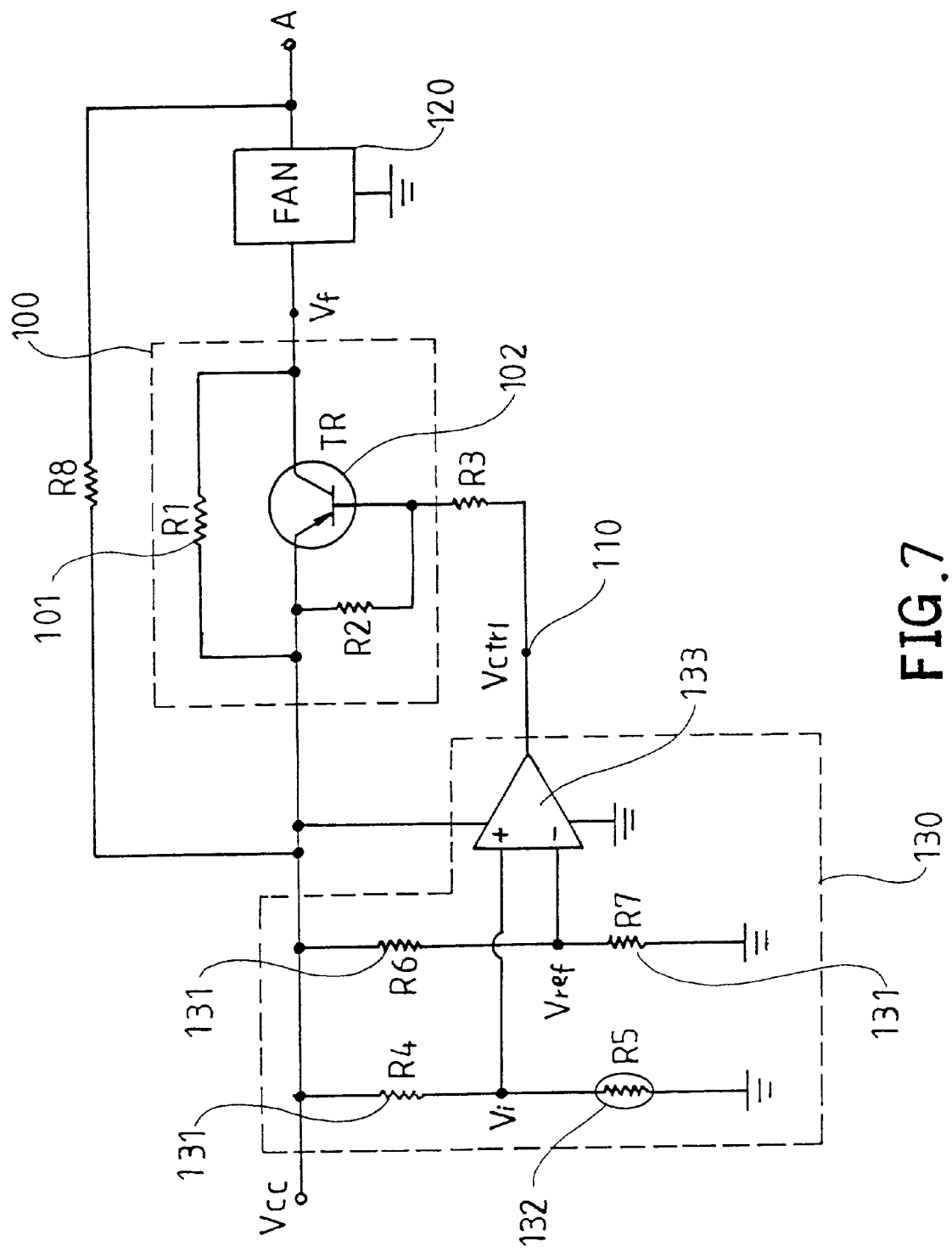
FIG. 7 is a diagram of a circuit of a second preferred embodiment of a fan motor having two-step speed control in accordance with the present invention.

FIG. 7 is a diagram of a circuit of a second preferred embodiment of a fan motor having two-stage speed control in accordance with the present invention. It is noted that like elements in both embodiments are designated by like reference numerals except for that the second embodiment is different from the first embodiment in the control voltage portion.

Referring to FIG. 7, the second preferred embodiment of the fan motor having a two-step speed control in accordance with the present invention includes a buffer circuit 100, a control voltage terminal 110, a fan 120, and a temperature-sensing circuit 130. The temperature-sensing circuit 130 includes a plurality of resistors R4, R6, R7 (131), a thermistor R5 (132), and a comparator 133. Resistors R7 and R6 are used to set a reference voltage Vref as an input for an inverted input terminal of the comparator 133. Resistor R4 and the thermistor 132 are used to detect the environmental temperature to decide a temperature voltage Vi inputted to a non-inverted input terminal of the comparator 133. After comparing the reference voltage Vref with the temperature voltage Vi by the comparator 133, the compared result is outputted to the control voltage 110 (Vctrl). Assume the switching temperature is 50° C., and when the thermistor R5 (132) detects that the environmental temperature is higher than 50° C., the temperature voltage Vi will be lower than the reference voltage Vref. As a result, the control voltage Vctrl outputted by the comparator 133 is zero. The transistor 102 of the buffer circuit 100 is closed and the fan 102 operates at the high-speed operation mode. When the temperature of the thermistor R5 (132) is decreased and the resistance thereof is increased such that the temperature voltage Vi is higher than the reference votage Vref, the control voltage Vctrl outputted by the comparator 133 is equal to the source voltage Vcc. Thus, the transistor 102 of the buffer circuit 100 is open and the fan 120 operates at the low-speed operation mode. Operation of the buffer circuit 100 has been clearly explained when describing the first embodiment and is therefore not described again to avoid redundancy.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A fan motor having two-step speed control, the fan motor comprising:
    a fan (120);
    a buffer circuit (100) mounted between a voltage source and a source terminal of the fan, the buffer circuit (100) comprising a resistor (101) and a transistor (102); and
    a control voltage terminal (110) connected to a base of the transistor (102);
    wherein when the voltage of the voltage source (Vcc) equals to a control voltage (Vctrl) of the control voltage terminal (110), the transistor (102) of the buffer circuit (100) is open such that electric current cannot pass, the resistor (101) divides the voltage and lowers a fan-driving voltage (Vf) at the source terminal of the fan (120), and the fan (120) operates at the low-speed operation mode by a low voltage; and
    wherein when the control voltage (Vctrl) is zero, the transistor (102) of the buffer circuit (100) is closed such that the fan-driving voltage Vf equals to the voltage of the voltage source (Vcc), and the fan (120) is driven by full voltage of the voltage source and thus operates at the high-speed operation mode.

2. The fan motor as claimed in claim 1, further comprising a temperature-sensing circuit (130), the temperature-sensing circuit (130) including an output connected to the control voltage terminal (110), the temperature-sensing circuit (130) including a plurality of resistors (131), a thermistor (132), and a comparator (133), the resistors (131) being used to set a reference voltage (Vref) as an input to an inverted input terminal of the comparator, the thermistor (132) being used to detect an environmental temperature to decide a temperature voltage (Vi) inputted to a non-inverted input terminal of the comparator (133), after comparing the reference voltage (Vref) with the temperature voltage (Vi) by the comparator (133), a compared result is outputted to the control voltage terminal to decide either high-speed or low-speed operation mode of the fan (120).

3. The fan motor as claimed in claim 1, wherein two leads of the resistor (101) of the buffer circuit (100) are connected to the emitter and collector of the transistor (102), respectively.

4. The fan motor as claimed in claim 1, wherein the base of the transistor (102) of the buffer circuit (100) is connected to the control voltage terminal (110) via a resistor (101), and wherein the base of the transistor (102) of the buffer circuit (100) is connected to the voltage source via another circuit (104).

5. The fan motor as claimed in claim 3, wherein rotating speed of the fan (120) at the low-speed operation mode is variable by means of changing resistance of the resistor (101) of the buffer circuit (100).

* * * * *